(12) United States Patent
Curlander et al.

(10) Patent No.: US 10,048,700 B1
(45) Date of Patent: Aug. 14, 2018

(54) GENERATING STATE INFORMATION FOR AUTONOMOUS VEHICLES

(71) Applicant: Amazon Technologies, Inc., Seattle, WA (US)

(72) Inventors: James Christopher Curlander, Bellevue, WA (US); Pragyana K. Mishra, Seattle, WA (US); Ryan Scott Russell, Bellevue, WA (US); Hilliard Bruce Siegel, Seattle, WA (US); Darren Ernest Canavor, Redmond, WA (US); Wesley Scott Lauka, Seattle, WA (US); Marshall Friend Tappen, Bainbridge Island, WA (US); Jules Cook Graybill, Seattle, WA (US); Udit Madan, Seattle, WA (US); Erik Resch Parker, Snohomish, WA (US); Jonathan Blair Norwood, Seattle, WA (US); Allan Scott Bathurst, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 14/955,573

(22) Filed: Dec. 1, 2015

(51) Int. Cl.
| | |
|---|---|
| G01C 22/00 | (2006.01) |
| G05D 1/00 | (2006.01) |
| G05D 1/02 | (2006.01) |
| G08G 1/16 | (2006.01) |
| G08G 1/01 | (2006.01) |

(52) U.S. Cl.
CPC ......... *G05D 1/0289* (2013.01); *G05D 1/0088* (2013.01); *G08G 1/0116* (2013.01); *G08G 1/164* (2013.01); *G08G 1/166* (2013.01)

(58) Field of Classification Search
CPC .. G05D 1/0289; G05D 1/0088; G08G 1/0116; G08G 1/164; G08G 1/166
USPC .......................................... 701/23
See application file for complete search history.

(56) References Cited

U.S. PATENT DOCUMENTS

| | | | | | |
|---|---|---|---|---|---|
| 6,812,888 | B2* | 11/2004 | Drury | .................... | G01C 21/34 |
| | | | | | 342/357.31 |
| 7,979,173 | B2* | 7/2011 | Breed | ..................... | G01S 19/00 |
| | | | | | 701/117 |
| 2015/0345971 | A1* | 12/2015 | Meuleau | ............ | G01C 21/3492 |
| | | | | | 701/25 |
| 2015/0349917 | A1* | 12/2015 | Skaaksrud | ......... | G06Q 10/0833 |
| | | | | | 370/328 |
| 2016/0178802 | A1* | 6/2016 | Stainvas Olshansky | .................. | |
| | | | | | G01S 17/95 |
| | | | | | 356/341 |

* cited by examiner

*Primary Examiner* — Harry Y Oh
(74) *Attorney, Agent, or Firm* — Thomas | Horstemeyer, LLP

(57) ABSTRACT

Disclosed are various embodiments for obtaining environmental data and operational data from autonomous vehicles in a roadway. A vehicle state of the autonomous vehicles can be updated using data that is obtained from nearby vehicles or other vehicles that are on the roadway. The roadway management system can also generate updates to the vehicle state based upon data obtained from sources external to autonomous vehicles.

14 Claims, 8 Drawing Sheets

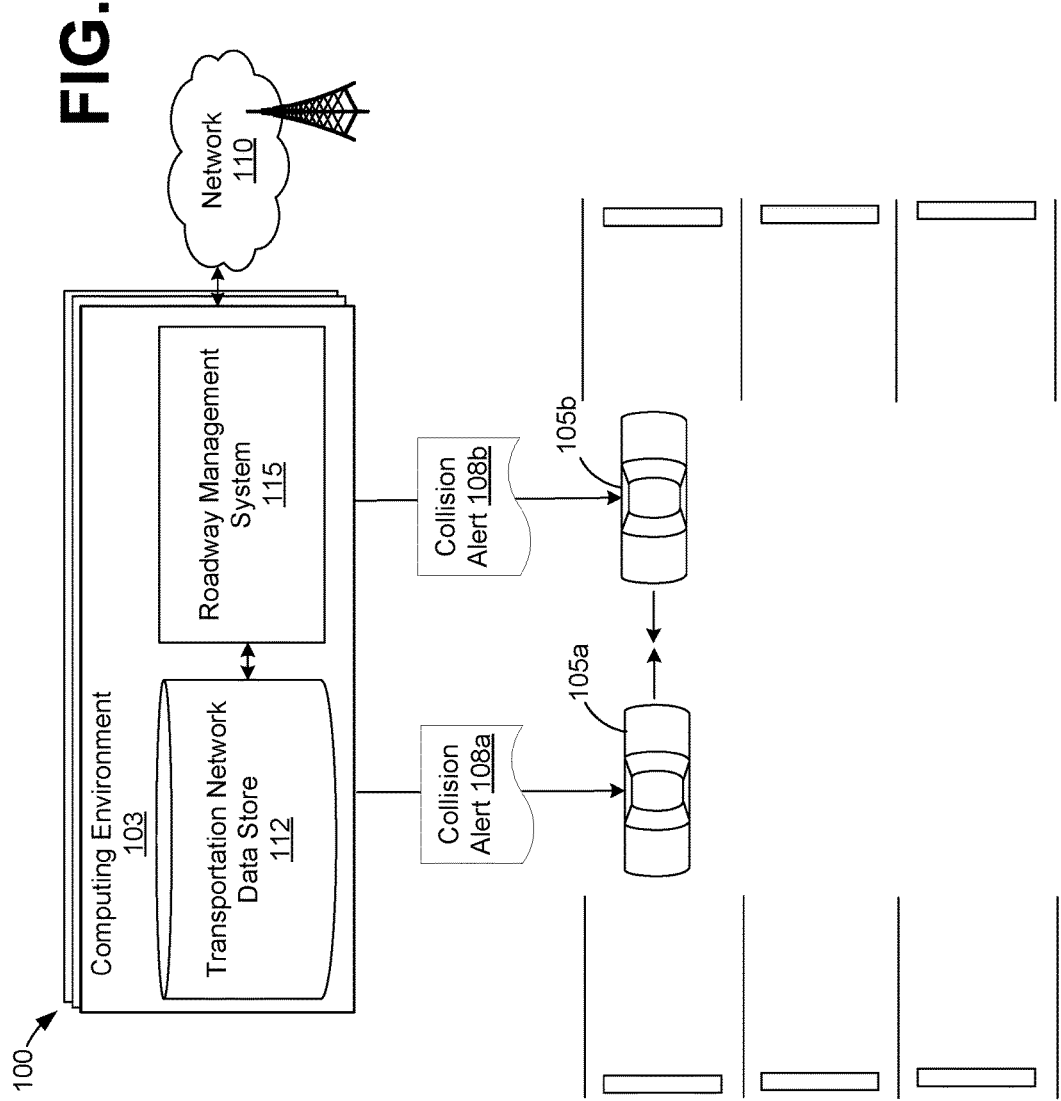

GENERATING STATE INFORMATION FOR AUTONOMOUS VEHICLES

BACKGROUND

Autonomous vehicles can facilitate efficient transportation networks. An autonomous vehicle can navigate roadways by relying upon one or more sensors with which the vehicle is equipped. The one or more sensors aid a vehicle controller in navigating the vehicle through roadways to a destination as well as for detection of obstacles and other vehicles in a roadway. Sensors can also facilitate detection of conditions that may affect how a vehicle should be operated, such as weather conditions, road hazard information, and other information affecting use of a roadway. However, an autonomous vehicle may not have information about a roadway or the state of other vehicles using the roadway.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1A-1B illustrate a networked environment including autonomous vehicles according to various embodiments of the present disclosure.

DETAILED DESCRIPTION

The present disclosure relates to detecting state information associated with autonomous vehicles using a roadway. An autonomous vehicle, in the context of this disclosure, is a self-driving vehicle that is capable of operation with minimal or no human input. An autonomous vehicle can be a passenger automobile, mass-transit vehicle, a commercial vehicle, street cleaning vehicle, law enforcement vehicle, emergency vehicle, or any other type of vehicle that can operate on a road. An autonomous vehicle can also include vehicles that are not traditionally thought of as transportation vehicles. For example, an autonomous vehicle can include a trash dumpster, a vacuum cleaner, a lawnmower, or any other type of vehicle or apparatus that can be equipped with a drive system and components that facilitate navigation via roadways.

According to some embodiments of the present disclosure, autonomous vehicles can communicate with one or more roadway management systems associated with a roadway network. The roadway management systems can direct autonomous vehicles through roadways or provide status information about roadways and conditions affecting roadways to autonomous vehicles to assist with navigation. The roadway management systems can also coordinate remediation of road hazards or other events that are detected on roadways as well as handle requests for assistance on roadways that are submitted by autonomous vehicles. Additionally, the roadway management system can provide information to autonomous vehicles that is collected from sources external to a particular vehicle that may affect operation and navigation of the vehicle.

For example, an autonomous vehicle on a roadway or a particular portion of a roadway can collect environmental data about its surroundings from various sensors with which the vehicle is equipped. However, the vehicle may not have data or information about a roadway or a route along multiple roadways that might be collected or detected by other autonomous vehicles or other sensors, e.g., sensors associated with a portion of a roadway, an intersection, a traffic signal, a particular location or region, or others, that are in communication with the roadway management system. Therefore, according to embodiments of this disclosure, the roadway management system can update the state associated with an autonomous vehicle with data that is collected from other vehicles and sensors. In this way, a particular autonomous vehicle can make routing or navigation decisions based upon information that it can collect and based on information that is provided by the roadway management system with which it is communicating.

Figure 1A:
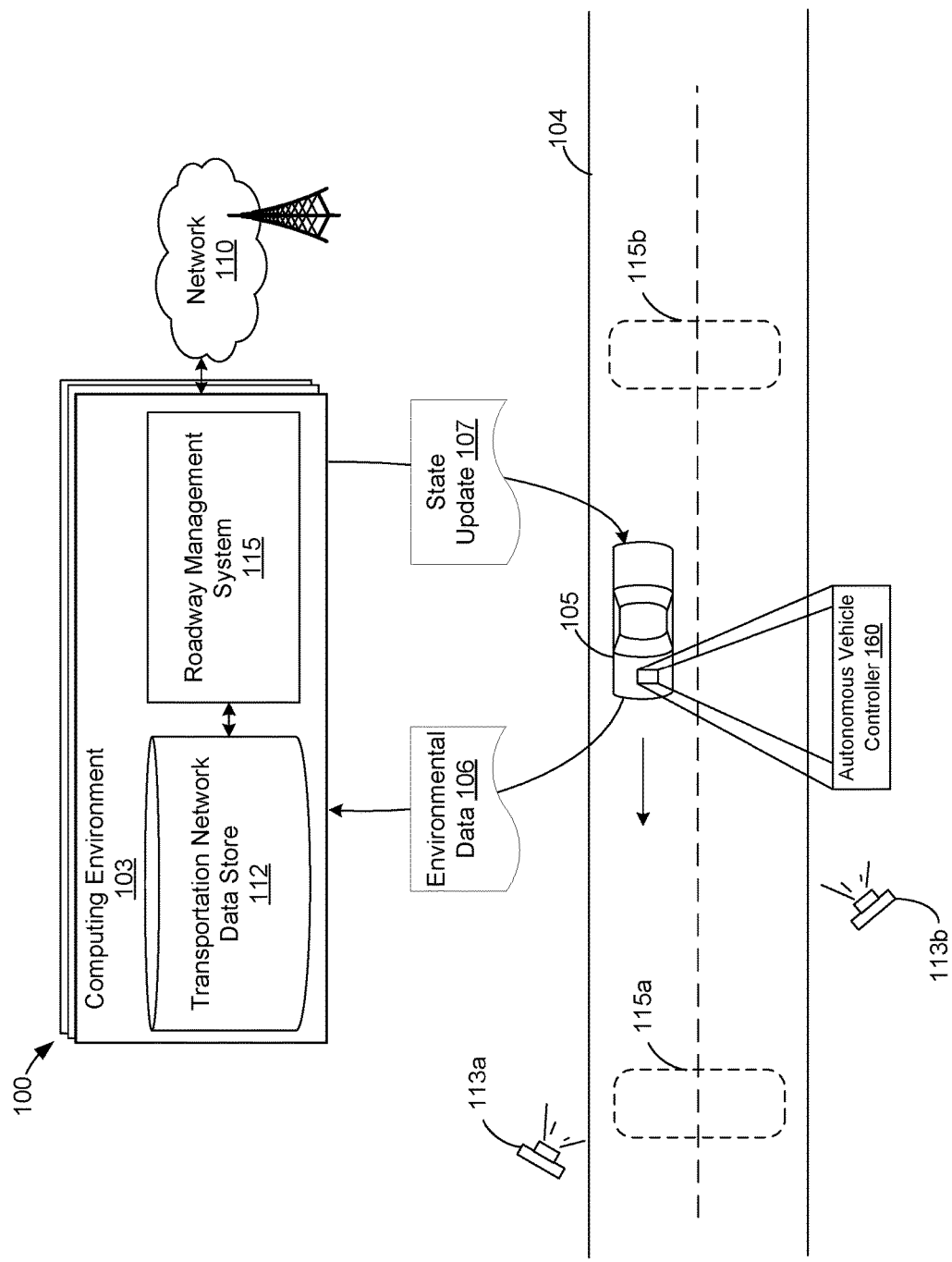

FIG. 1A illustrates a networked environment 100 that includes an autonomous vehicle using a roadway. The networked environment 100 includes a computing environment 103, a roadway 104, a network 110, and a vehicle 105. As shown in FIG. 1A, the computing environment 103 includes a transportation network data store 112 and a roadway management system 115. The roadway 104 can also be used by multiple vehicles 105, which can be equipped with the ability to communicate with the roadway management system 115.

A vehicle 105 can be embodied as any type of vehicle, including but not limited to cars, trucks, vans, buses, street cars, helicopters, trains, subways, aircrafts, boats, etc., regardless of how powered or driven. A vehicle 105 includes an autonomous vehicle controller that controls its maneuvering operations on surface streets, highways, skyways, parking lots, waterways, etc. The autonomous vehicle controller may also control additional components within the vehicle that allow the vehicle to be repurposed to perform a variety of tasks. The autonomous vehicle controller of the vehicle 105 is in communication with the roadway management system 115 via the network 110 and receives information or instructions related to its usage of the roadway 104.

In order to facilitate navigation through various roadways, the vehicle 105, or an autonomous vehicle controller 160 that is controlling the vehicle 105, can obtain environmental data 106 about its surroundings from various sensors with which the vehicle 105 is equipped. For example, the vehicle 105 can capture data about whether other vehicles 105 are in its vicinity or in close proximity to the vehicle 105, a location of the vehicle 105, a velocity of the vehicle 105, an orientation of the vehicle 105, a number and makeup of passengers, information about cargo of the vehicle 105, a size and weight of the vehicle, image or videos from cameras in or on the vehicle, and other data. Environmental data 106 can also include information captured by the vehicle 105 or its sensors about street signs, roadway characteristics, events that are detected on the roadway by the vehicle 105 (e.g., collisions, debris, or other unexpected conditions), blockages or obstructions on the roadway, detours, weather related events (e.g., ice, snow, flooding, downed trees, etc.), traffic conditions, or any other conditions affecting a roadway 104 that can be detected by the vehicle 105 or its sensors.

The vehicle 105 can also capture vehicle operational data about the status of the vehicle 105 and the operation of the various systems within the vehicle 105. The vehicle operational data can include information about the operational status or health of a drive system or other systems of the vehicle 105.

An autonomous vehicle controller 160 associated with the vehicle 105 can generate a vehicle state, or a status of the vehicle 105, based upon the environmental data 106 and vehicle operational data that is captured. This vehicle state can be continuously monitored and updated with information obtained from sensors of the vehicle 105 with information about traffic conditions, an updated location of the vehicle 105, velocity data, the existence and location of nearby vehicles 105, information about the operational state and capability of the vehicle 105, and other data that the vehicle 105 can capture through one or more sensors.

The vehicle 105 can transmit the environmental data 106 about its surroundings to the roadway management system 115. The roadway management system 115 can also obtain environmental data 106 from other vehicles 105 that are using the roadway 104. The roadway management system 115 can also obtain information about the state of the roadway 104 from other sources that are external to vehicles 105 using the roadway 104. For example, the roadway management system 115 can obtain traffic data from traffic sensors, such as cameras positioned at various points of the roadway 104 or in-road sensors that detect the presence and/or speed of vehicles 105 at various points on the roadway. Traffic sensors can also include above-ground sensors that detect the speed and/or volume of vehicles 105 at various points along a roadway 104. Based upon the data from various traffic sensors, the roadway management system 115 can determine traffic conditions along a roadway 104.

Examples of traffic sensors in communication with the roadway management system 115 can include traffic cameras 113*a*, 113*b* or in-road (or on-road) traffic sensors 115*a*, 115*b*. The traffic cameras 113*a*, 113*b* can communicate imagery or video of a portion of the roadway 104 to the roadway management system 115. The in-road (or on-road) traffic sensors 115*a*, 115*b* can include sensors embedded within (or placed on or near) the roadway that detect the presence and/or speed of vehicles 105 on the roadway 104 as vehicles 105 pass over or near the traffic sensors 115*a*, 115*b*. Based upon the data from the traffic sensors and potentially other data sources, the roadway management system 115 can provide information to autonomous vehicle controller 160 that can augment information about the state of the vehicle 105 and its surroundings.

In some examples, the roadway management system 115 can employ various image recognition techniques upon imagery or video captured by cameras 113 that are positioned on the roadway 104 to identify road hazards, assess traffic conditions, and/or identify other environmental conditions. For example, the roadway management system 115 can detect obstructions, potholes or other issues with the roadway 104 based upon an analysis of imagery or video from various cameras. As another example, the roadway management system 115 can identify the presence of other vehicles 105 on the roadway that may present a risk of an imminent collision based upon an analysis of imagery obtained from cameras on the roadway 104 or integrated into a vehicle 105.

The roadway management system 115 can also obtain data about weather conditions on or near a roadway 104. Weather data can be obtained from an external weather data resource or from weather sensors that are positioned that are located in a similar geographical area relative to a particular portion of the roadway 104. The roadway management system 115 can also obtain data about roadway conditions, such as information about roadway 104 construction, maintenance, road hazards, or any other data that may affect usage of a particular roadway 104. Data about roadway conditions can be maintained in the transportation network data store 112 or obtained from an external data source.

Accordingly, the roadway management system 115 can generate a state update 107 that is transmitted to the autonomous vehicle controller 160 via the network 110. The state update 107 can include select environmental data 106 from other vehicles 105 that are in proximity to the vehicle 105 or in other locations on the roadway 104. The state update 107 can also include environmental data 106 about the location and speed of other vehicles 105, road conditions observed by the sensors in the other vehicles 105, information about a destination of the other vehicles 105 on the roadway 104, or any other sensor data captured as environmental data 106 by other vehicles 105.

The state update 107 can further include data about weather conditions, roadway conditions, traffic conditions, or any other data obtained by the roadway management system 115 from data sources that do not include environmental data 106 from vehicles 105 using the roadway 104. In this way, the vehicle 105 can maintain a state or status that reflects its worldview of the roadway 104, including the location of vehicles 105 in its vicinity, weather conditions, roadway conditions, and other data, that includes information gathered from sources other than its own sensors, such as other vehicles 105 and other sensors that are in communication with the roadway management system 115. Accordingly, the vehicle 105 can make navigation and routing decisions based upon this information, which can result in a more efficient or a safer route to a particular destination.

Referring next to FIG. 1B, shown is an alternative example of a roadway 104, which is embodied as a parking lot with various parking spaces. In the example of FIG. 1B, the vehicle 105*a* and vehicle 105*b* are traveling in a direction towards one another. As noted above, the vehicles 105*a* and 105*b* can also periodically generate environmental data 106 and vehicle operational data that is transmitted to the roadway management system 115. In one embodiment, the roadway management system 115 can calculate vectors associated with the vehicles 105*a* and 105*b* that reflect a velocity and direction of the respective vehicles 105*a*, 105*b* based upon the environmental data 106 and vehicle operational data. The vectors can also be associated with a temporal component and a location component that identify a timestamp and a location associated with the vector. The roadway management system 115 can also determine, based upon the calculated vectors, whether an imminent collision is possible or likely by determining whether the vectors intersect taking into account the location component and temporal component associated with the vectors. If an imminent collision is likely, the roadway management system 115 can transmit a collision alert 108a, 108b to the vehicles 105a and 105b.

The roadway management system 115 can take into account the shape or route of a roadway 104 on which the vehicles are located to determine whether an imminent collision is likely. For example, vectors associated with the vehicles 105a and 105b may appear to be intersecting, but they may be using a portion of a roadway that is curved, so the vehicles are not actually in danger of an imminent collision, as the vehicles 105a and 105b can be assumed to follow the roadway and thereby avoid a collision.

As another example, if vectors associated vehicles 105a and 105b are in the same lane of a roadway 104 and traveling in the same direction, the roadway management system 115 can detect an imminent collision if an obstruction in the roadway may eventually cause the two vehicles 105a and 105b to merge into one another. In this way, even if the vectors associated with each of the vehicles do not indicate an imminent condition, the roadway management system 115 can detect an imminent collision if external factors, such as road construction, obstruction, or other factors, may cause the two vehicles 105a and 105b to eventually veer towards one another.

In one example, in response to the collision alerts 108a, 108b, one or both of the vehicles 105a, 105b, can generate a routing instruction that causes the vehicle 105a, 105b to avoid the collision. For example, vehicle 105a can swerve or stop to avoid colliding with vehicle 105b. As another example, vehicle 105a can communicate directly with vehicle 105b so that one or both of the vehicles 105a and 105b reroutes to avoid the collision.

In some examples, a collision alert 108 generated by the roadway management system 115 can include a routing instruction or routing directive that can override a routing instruction that is generated by the vehicle 105. For example, the roadway management system 115 can determine a respective routing instruction that can prevent a collision between each of one or more vehicles 105 at risk of an imminent collision. The respective routing instruction can be embedded in a collision alert 108 and sent to a vehicle 105. The vehicle 105 can then act on the routing instruction embedded within the collision alert 108 by overriding a routing instruction that is generated by the autonomous vehicle controller 160.

Figure 2:
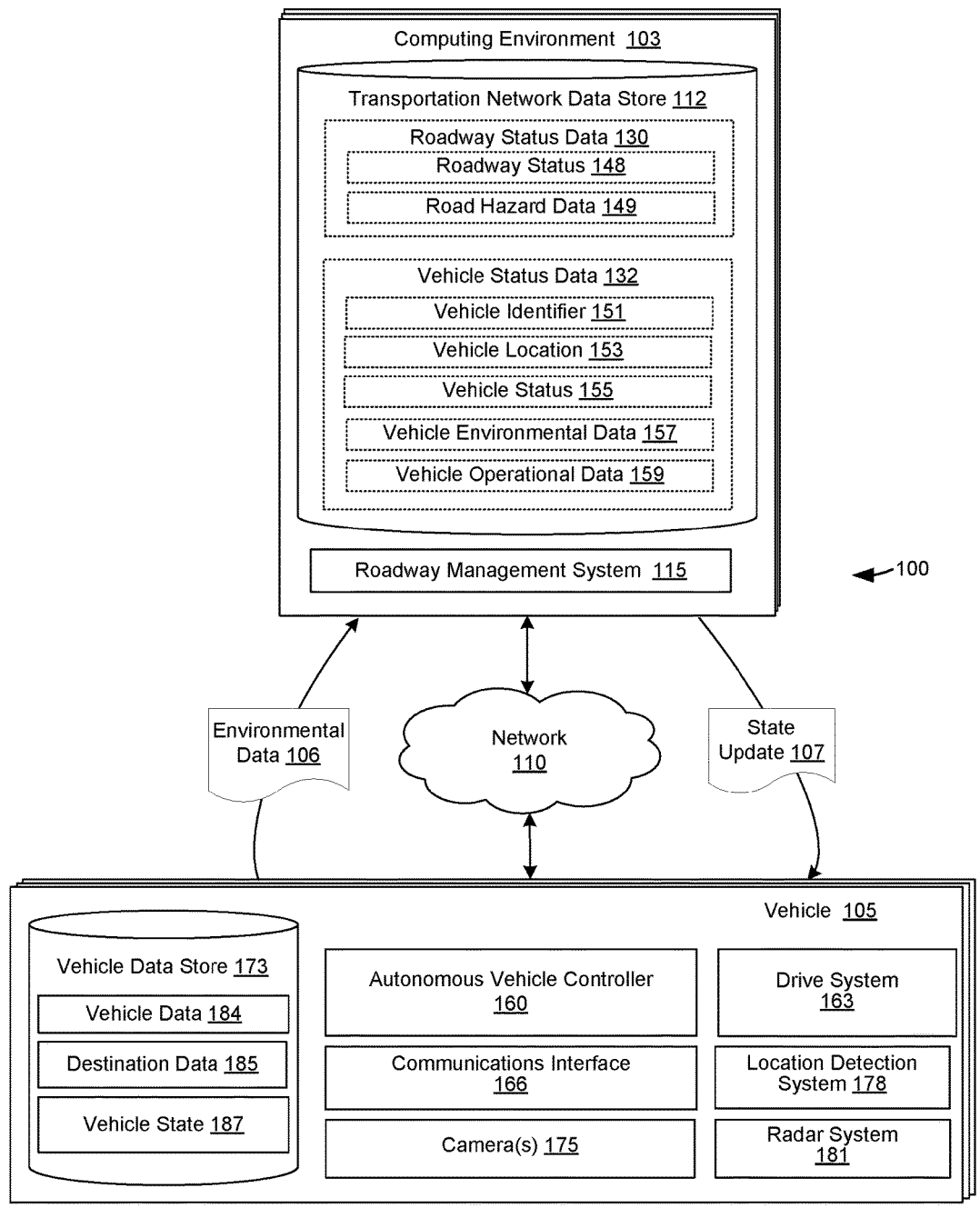
FIG. 2 illustrates an alternative view of the networked environment of FIGS. 1A-1B according to various embodiments of the present disclosure.

Turning now to FIG. 2, an alternative view of the networked environment 100 in FIGS. 1A-1B is illustrated according to various embodiments of the present disclosure. The networked environment 100 includes the computing environment 103, the network 110, and the vehicle 105 in data communication via the network 110. The network 110 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in the transportation network data store 112 that is accessible to the computing environment 103. The transportation network data store 112 may be representative of a plurality of data stores 112 as can be appreciated. The data stored in the transportation network data store 112, for example, is associated with the operation of the various applications and/or functional entities described below.

The components executed on the computing environment 103, for example, include the roadway management system 115, and other applications, services, processes, systems, engines, or functionality not discussed in detail herein.

The roadway management system 115 can monitor and analyze the status of a roadway. For example, the roadway management system 115 can obtain data from various roadway sensors. Roadway sensors can include traffic cameras, in-ground vehicle sensors, such as inductive sensors, motion detectors, or other sensors or devices that are associated with a roadway 104. For example, the roadway management system 115 can determine traffic conditions or a volume or quantity of vehicles 105 that are within a roadway segment based upon data from roadway sensors that are external to vehicles 105. The roadway management system 115 can determine an average velocity of vehicles 105 that are within a roadway segment from which traffic conditions can be calculated. The roadway management system 115 can also determine whether obstructions, damage or other factors are affecting road conditions of one or more lanes within a roadway segment. The roadway management system 115 can also obtain data about weather conditions, which can inform traffic calculations and roadway conditions.

The roadway management system 115 can also obtain environmental data 106 that is generated by vehicles 105 about the status and surroundings as observed by the vehicles 105 using a roadway. The roadway management system 115 can extract information from environmental data 106 received from vehicles 105 and provide state updates 107 to other vehicles 105 using the roadway or vehicles 105 that are in proximity to one another.

The roadway management system 115 can also facilitate remediation of road hazards that are detected in a particular location of a roadway. Based upon information from roadway sensors or environmental data 106 received from vehicles 105, the roadway management system 115 can determine whether a road hazard may exist in a particular portion of the roadway. If a potential road hazard exists, the roadway management system 115 can dispatch assistance or a resource that can remediate the road hazard to the location. The roadway management system 115 can dispatch assistance or other resources by directing a vehicle 105 with a particular capability to travel to the location to render assistance or remediate a road hazard. The roadway management system 115 can also generate a request that is transmitted to a user or group of users about the potential road hazard.

In this context, a road hazard can be a collision between vehicles 105 or between a vehicle 105, a pedestrian or another object that is not a vehicle 105. The road hazard can also be a pothole or an icy or slippery patch on the roadway. The roadway management system 115 can detect a collision between a vehicle 105 and some other object from the environmental data 106. In one example, a vehicle 105 can transmit, as environmental data 106, a collision alert when a collision has been detected by vehicle sensors. As another example, a vehicle 105 can transmit acceleration data as environmental data 106, and the roadway management system 115 can detect a collision when a sudden deceleration or acceleration is reflected in the environmental data 106. In this scenario, the roadway management system 115 can dispatch emergency vehicles, such as police, fire and ambulance, to the location reflected in the environmental data 106.

The roadway management system 115 can also detect a potential road hazard when a degree of wheel spin detected by sensors of a vehicle 105 exceeds a threshold and is reported in environmental data 106 by a threshold number of vehicles 105. In some scenarios, the roadway management system 115 can determine that a potential icy patch of the roadway exists if the temperature reported for the area of the roadway is at or below a threshold temperature, such as 32 degrees Fahrenheit. A road hazard can also be detected in these scenarios if a certain precipitation condition, such as ice or snow, is detected in the area. In this scenario, the roadway management system 115 can initiate remediation of the road hazard by dispatching salt trucks or other repair or remediation resources to the location reflected in the environmental data 106.

The roadway management system 115 can also detect a potential pothole when a degree of suspension travel detected by sensors of a vehicle 105 exceeds a threshold and is reported in environmental data 106 by a threshold number of vehicles 105. If suspension travel exceeds a threshold amount and is reported by a threshold number of vehicles 105, the roadway management system 115 can determine that a pothole or other defect in the roadway exists. In this scenario, the roadway management system 115 can initiate remediation of the road hazard by dispatching repair or remediation resources to the location reflected in the environmental data 106.

The data stored in the transportation network data store 112 includes, for example, roadway status data 130, vehicle status data 132, and potentially other data. The roadway status data 130 includes data about one or more roadways or portions of roadways that the roadway management system 115 manages and/or monitors. A roadway or a portion of a roadway can include a stretch of public or private road, a sidewalk, a bridge, a tollway, a freeway, a parking lot, or any other stretch of roadway on which vehicles can move. The roadway status data 130 can include mapping and location data associated with the roadways managed by the roadway management system 115.

The roadway status 148 within the roadway status data 130 includes status information associated with the roadway. Roadway status 148 can be generated based upon traffic cameras, in-ground or above-ground vehicle sensors, motion detectors, telemetry data from vehicles 105 on the roadway, road construction data, lane closure data, law enforcement or emergency agency data sources, weather data sources or weather forecasting data sources, or other sources. The roadway status 148 reflects traffic conditions, weather conditions, and whether there are lane closures or other forms of road construction or obstructions that may affect how vehicles 105 should be assigned to lanes within the roadway. Roadway status 148 can also include a quantity of vehicles 105 in the roadway and in the respective lanes of the roadway. Roadway status 148 can further include a velocity of individual vehicles 105 or an average velocity of vehicles 105 in the respective lanes of the roadway.

Road hazard data 149 contains information about potential road hazards that are detected by the roadway management system 115. The roadway management system 115 can identify possible road hazards from the roadway status 148 and initiate remediation of the road hazard. In some instances, the roadway management system 115 can generate alerts to certain users or groups of users about a particular road hazard. In other instances, the roadway management system 115 can submit a request for remediation of a road hazard by identifying the location of the road hazard by a remediation resource. A remediation resource can include, for example, a salt dispensing vehicle, an emergency vehicle, a road repair vehicle or team, or other appropriate remediation resource. The road hazard data 149 can also include the status of remediation of a particular road hazard.

For example, upon dispatching of a resource to remediate a road hazard, the roadway management system 115 can designate the road hazard as an active road hazard until receipt of confirmation that the road hazard has been remediated from a remediation resource. In this way, the roadway management system 115 can include the road hazard in a state update 107 provided to a vehicle 105 so that vehicles 105 can make appropriate routing decisions based upon the existence of the road hazard. When a road hazard is designated as remediated or as an inactive road hazard, the roadway management system 115 can remove the road hazard from state updates 107 provided to vehicles.

The vehicle status data 132 includes various information about vehicles 105 that are using a roadway managed by or associated with the roadway management system 115. The vehicle status data 132 can include records that are associated with the various vehicles 105 on the roadway 104. Accordingly, the vehicle status data 132 can include a vehicle identifier 151 that uniquely identifies a vehicle 105 on the roadway with respect to other vehicles 105. The vehicle location 153 represents location data identifying a particular location on the roadway 104 of a particular vehicle 105. The location data can be extracted from environmental data 106 provided by a vehicle 105 to the roadway management system 115.

The vehicle status 155 represents the operational state of a vehicle 105. The vehicle status 155 can include the speed and direction of a vehicle. Vehicle status 155 can also include information about particular capabilities of the vehicle 105. For example, a particular vehicle 105 may be equipped with certain resources that can assist other vehicles 105 or with remediation of road hazards. For example, a vehicle 105 can be equipped with jumper cables, a battery charger, tire changing equipment, or other specialized equipment that can assist another vehicle 105. As another example, a vehicle 105 may be equipped with snowplow or salt dispensing equipment to assist with winter weather road conditions. In this way, when dispatching resources or other vehicles 105 to remediate road hazards or assist a vehicle 105 in need of assistance, the roadway management system 115 can do so by tasking a nearby vehicle 105 with the appropriate operational capabilities.

The operational state reflected in the vehicle status 155 can also reflect whether the vehicle 105 requires assistance from other vehicles 105 or other users of the roadway 104. For example, the vehicle 105 may submit a request for assistance with a mechanical issue to the roadway management system 115, which can dispatch another vehicle 105 or another user to assist the vehicle 105 at the location reflected in the vehicle location 153. The request for assistance can specify a type of assistance that is required, such as whether a jumpstart, a tire change, a tow, or other forms of vehicle assistance is requested. Based upon the type of assistance requested, the roadway management system 115 can dispatch a vehicle 105 having operational capabilities that correspond to the type.

The vehicle environmental data 157 can include other information about a vehicle 105 that is reflected in the environmental data 106 provided by the vehicle 105 to the roadway management system 115. The vehicle environmental data 157 can include velocity and directional data associated with a vehicle 105, or data about occupants or cargo of a vehicle 105. The vehicle environmental data 157 can also include information about a destination of the vehicle 105 or a route selected by the vehicle 105 to the destination. The vehicle environmental data 157 can include information about other vehicles 105 or objects detected in proximity to the vehicle 105.

The vehicle operational data 159 can include data obtained from sensors within the vehicle 105 that capture data about operation or health of the vehicle. For example, such data can include fuel levels, battery levels, tire pressure data, tire tread data, or other operational or safety data.

The vehicle 105 can include an autonomous vehicle controller 160, a drive system 163, a communication interface 166, a vehicle data store 173, camera 175, location detection system 178, a radar system 181, and/or other vehicle related components. The autonomous vehicle controller 160 may be embodied as analog, digital, or mixed analog and digital processing circuitry and memory that direct the operation of the vehicle 105 and the electromechanical drive system 163 of the vehicle. In that sense, the autonomous vehicle controller 160 is an example of an embedded real-time control system in which control outputs are produced in response to control input conditions. The autonomous vehicle controller 160 may include various sensors, such as, for example, cameras, three-dimensional (3D) laser scanners, laser illuminated detecting and ranging sensors (LIDAR), radar, range scanners, 3D depth sensing devices, etc., which may be relied upon to analyze the surrounding environment, develop control signals for operation of the drive system 163, detect an occurrence of an event (e.g., brush fire, car accident, etc.), and/or other actions. Among various embodiments, the autonomous vehicle controller 160 may perform the processing necessary to direct operation of the vehicle 105 alone or in tandem with other computing systems, including but not limited to the drive system 163, the computing environment 103, and/or other computing devices and systems. The autonomous vehicle controller 160 may include other applications, services, processes, systems, engines, or functionality not discussed in detail herein.

The autonomous vehicle controller 160 may access the included memory areas, including the vehicle data store 173, that store data used for navigation of the vehicle 105, such as street image or view data, roadway data, navigation data, etc. The autonomous vehicle controller 160 is configured to use feedback from its sensors and the drive system 163, for example, to develop an appropriate and suitable route for travel. The route may be determined primarily from a destination location submitted by a passenger of the vehicle or any other user or device that can direct the activities of the vehicle 105.

Among the embodiments, the autonomous vehicle controller 160 may be integrated with the drive system 163 of the vehicle 105 in any suitable manner to permit the autonomous vehicle controller 160 to control the operations of the vehicle 105, including but not limited to the acceleration, braking, turning, signal and lamp operation, etc. In that sense, the autonomous vehicle controller 160 may be electrically, mechanically, and electromechanically integrated with the drive system 163 and the other elements of the vehicle 105.

The drive system 163 may be embodied as the powertrain and associated electrical, mechanical, hydraulic, electromechanical, control, and diagnostic systems of the vehicle 105. Thus, the drive system 163 may include one or more engines, motors, transmissions, steering, braking, and other systems to control the movement of the vehicle 105 on surface streets, parking lots, off-road surfaces, etc. As noted above, the drive system 163 operates the vehicle 105 at the direction of the autonomous vehicle controller 160. The drive system 163 can also include one or more vehicle sensors that can capture telemetry related to operation of the vehicle 105, such as wheel spin data, traction data, suspension travel, emissions data, or other operational data associated with the vehicle 105. Data from the drive system 163 can be reported to the roadway management system 115 as vehicle operational data 159 or as environmental data 106 in various embodiments.

The communications interface 166 may be embodied as one or more physical layer communications systems and associated software interfaces for communication between the vehicle 105, the computing environment 103, and/or other vehicles 105 via the network 110. In that context, the communications interface 166 may include one or more wired or wireless (e.g., cellular, satellite, WiFi®, Bluetooth®, etc.) communications interfaces. Among other data, the communications interface 166 may be relied upon to transmit requests to use a portion of a roadway to a roadway management system 115 that is assigned to manage the roadway. The communications interface 166 may also be employed to facilitate vehicle 105 to vehicle 105 communications where an autonomous vehicle controller 160 of a first vehicle 105 can communicate with an autonomous vehicle controller 160 of another vehicle 105 to facilitate navigation through a roadway and to eliminate vehicle collisions.

The data stored in the vehicle data store 173 includes vehicle data 184, destination data 185, and a vehicle state 187. The vehicle data 184 can include any information or data about the vehicle 105 or the status of the vehicle 105 that can be used to facilitate navigation or assigning the vehicle 105 to lanes in a roadway. Vehicle data 184 can include a vehicle identifier such as, for example, a vehicle identification number (VIN) and/or other type of unique identifier used to identify the vehicle 105. The vehicle data 184 can further include a vehicle type that includes make, model, and/or other vehicle related information. The vehicle data 184 can further include operational capabilities of the vehicle, such as its size and weight, its passenger capacity, its acceleration capability or its velocity capabilities. Vehicle capabilities can also include any capabilities that may be able to render assistance to other vehicles 105 or remediate road hazards that are detected in the roadway 104.

Destination data 185 includes information about a destination to which the autonomous vehicle controller 160 can direct the vehicle 105. Destination data 185 can be calculated or determined by the autonomous vehicle controller 160 based upon a destination identified for the vehicle 105 by a user. The destination data 185 can include a location and waypoints associated with a destination as well as one or more tasks to complete at waypoints and/or at the destination. For example, the destination data 185 can specify that the vehicle 105 should deliver one or more items to various locations along a route. As another example, the destination data 185 can specify that the vehicle 105 should take a particular route to a destination taking account traffic conditions and weather conditions as well as route speed or safety.

The vehicle state 187 can represent the state of a vehicle 105 as well as its surroundings. The vehicle state 187 can include information about the vehicle 105 and nearby vehicles 105 on the roadway 104. In one embodiment, the vehicle state 187 can represent a map of the location of the vehicle 105 and the location of other vehicles 105 that are using the roadway 104. The vehicle state 187 can also include data about road hazards and other road conditions observed or detected by the camera 175, drive system 163, radar system 181, or other sensors associated with the vehicle 105.

Vehicle state 187 can also include telemetry data received from the autonomous vehicle controller of the vehicle 105. The telemetry data may include data obtained from drive system 163, sensors, resource supplies (e.g., fuel level, battery capacity), fuel efficiency, a propulsion type, location data, system diagnostic data and/or other relevant telemetry information related to the vehicle 105. For example, the system diagnostic data may include on-board diagnostic (OBD) measurement data from the vehicles 105 such as, for example, diagnostic trouble codes, fuel efficiency, vehicle speed, revolutions per minute (RPM), emissions, radar sensor data, and/or other information.

The cameras 175 may be embodied as one or more cameras having a field of view within the passenger cabin of the vehicle 105 and/or a field of view outside the vehicle 105. Using the cameras 175, still images and/or video may be relayed from the vehicle 105 to the computing environment 103, where it may be processed by the roadway management system 115. The images and/or video may be relied upon by the roadway management system 115 to determine whether vehicles 105 are in the same lane or neighboring lanes in the vicinity of a vehicle 105. Thus, video monitoring and continuous recording may be relied upon for both the inside and outside of the vehicles 105.

In one scenario, the roadway management system 115 can determine whether imagery from a camera aimed in front of the vehicle 105 contains an image that can be associated with another vehicle 105 to determine whether there is another vehicle 105 in front of the vehicle 105. Similarly, the roadway management system 115 can determine whether imagery from a camera aimed at an adjacent lane contains an image that can be associated with another vehicle 105 to determine whether a vehicle 105 is in a neighboring lane. The roadway management system 115 can also determine whether imagery from a camera aimed behind the vehicle 105 contains an image that can be associated with another vehicle 105 to determine whether another vehicle 105 is behind the vehicle 105.

The location detection system 178 may be embodied as a global positioning system (GPS) receiver, Global Navigation Satellite System (GLONASS), or other type of location finding system that is configured to identify the geographic location of the vehicles 105 as they move from place to place. The radar system 181 may be embodied as a device configured to monitor the speed of the vehicle 105 itself and/or other vehicles 105 around the vehicle. The autonomous vehicle controller 160 can use radar data, data from cameras, and/or location data to navigate within lanes of a roadway. Data from the location detection system 178 can be reported to the roadway management system 115 as vehicle operational data 159 or as environmental data 106 in various embodiments.

The vehicle state 187 can include information about the vehicle and its surroundings that is obtained from the camera 175, location detection system 178, radar system 181, and any other vehicle sensors. The autonomous vehicle controller 160 can generate the vehicle state 187 to facilitate navigation of the vehicle 105. In other words, the autonomous vehicle controller 160 can generate routing decisions for the vehicle 105 based at least in part upon the vehicle state 187, as the vehicle state 187 can store information about the location of the vehicle 105, surrounding vehicles 105, and the operational state of the vehicle 105.

Additionally, according to embodiments of the disclosure, the vehicle state 187 can be updated or supplemented with information obtained from the roadway management system 115, which includes data obtained from other vehicles 105 and other data sources external to vehicles 105. In this way, rather than relying solely upon information obtained from the sensors of the vehicle 105 to make routing decisions, the autonomous vehicle controller 160 can also rely upon information that is provided by the roadway management system 115, which may provide a fuller picture of the state of a vehicle 105, its surroundings, or a roadway 104 upon which a vehicle 105 is traveling.

Next, a description of how the roadway management system 115 and autonomous vehicle controller 160 can operate is provided. To begin, a vehicle 105 can map a route to a destination specified by a user using mapping data that can be retrieved or stored by the autonomous vehicle controller 160. The autonomous vehicle controller 160 can map a route on behalf of a vehicle 105 by taking into account the vehicle state 187. The vehicle state 187 can include information from environmental data 106 generated by the vehicle 105 and from information obtained from the roadway management system 115.

In one scenario, the autonomous vehicle controller 160 can generate environmental data 106 that includes data taken from the various sensors of the vehicle 105, such as the camera 175, location detection system 178, radar system 181, drive system 163 or other sensors. The environmental data 106 can be used to populate and/or update the vehicle state 187. The vehicle 105 can also transmit the environmental data 106 to the roadway management system 115. The roadway management system 115 can update the vehicle status data 132 in the transportation network data store 112 with information extracted from the environmental data 106. For example, the environmental data 106 can include a vehicle identifier 151, such as a VIN, with which the roadway management system 115 can identify an appropriate record for the vehicle 105 within the vehicle status data 132.

The roadway management system 115 can extract the vehicle location 153, vehicle status 155, and other information from the environmental data 106 or vehicle operational data 159 received from the vehicle 105. The extracted data can be associated with the vehicle 105 in the transportation network data store 112. It should be noted that the transportation network data store 112 can receive environmental data 106 from many vehicles 105 using the roadway 104 continuously and potentially simultaneously with one another. The roadway management system 115 can update the vehicle status data 132 associated with these vehicles 105 as well.

The roadway management system 115 can also continuously and/or periodically obtain roadway status data 130 from sources that are external to vehicles 105. As noted above, the roadway management system 115 can obtain information about traffic, road conditions, weather conditions, or other roadway conditions from roadway sensors, traffic sensors, weather sensors, or data sources that can provide roadway status data 130. The roadway management system 115 can populate the roadway status 148 and road hazard data 149 with information about the current status of a roadway 104.

In some embodiments, the road hazard data 149 can be inferred from environmental data 106 received from vehicles. As noted above, if a threshold number of vehicles 105 report a degree of wheel spin that exceeds a threshold associated with an unsafe condition and a temperature reading in the area of the location from which the wheel spin was reported is at or below a freezing temperature, the roadway management system 115 can assume that an icy or slippery condition exists. Similarly, if an amount of suspension travel, or an amount of movement detected in a shock absorber, spring, or other suspension component of a vehicle 105, exceeds a threshold, the roadway management system 115 can assume that a pothole condition exists at a location associated with the vehicles 105 reporting such data.

In addition to receiving environmental data 106, vehicle operational data 159, and other roadway status data 130, the roadway management system 115 can generate state updates 107 that can be sent to vehicles 105. Vehicles 105 can update their respective vehicle state 187 with information from the state update 107 received from the roadway management system 115. The roadway management system 115 can generate respective state updates 107 for respective vehicles 105 by including information obtained from other vehicles that are within a specified proximity of a vehicle 105. In some examples, the state update 107 for a vehicle can include information from other vehicles 105 that are on the same roadway 104 as the vehicle 105 or that are on a roadway 104 that is on a route calculated by the autonomous vehicle controller 160.

The state update 107 can include information about the velocity and location of other vehicles 105 that are within a specified proximity of the vehicle 105. A vehicle 105 receiving such a state update 107 can update the vehicle state 187 with information about the location and velocity of other vehicles 105. In one embodiment, the autonomous vehicle controller 160 can generate a routing instruction that adjusts the speed, steering, or routing of the vehicle 105 based upon the location and velocity of other vehicles 105.

The state update 107 can also include information about the location of road hazards associated with a roadway 104 that is being used by the vehicle 105. For example, the state update 107 can identify potholes, icy or slippery conditions, road construction, lane closures, or other obstructions in a roadway 104. In one embodiment, the autonomous vehicle controller 160 can generate a routing instruction that adjusts the speed, steering, or routing of the vehicle 105 based upon the location of road hazards identified in the state update 107.

The state update 107 can also include information about traffic conditions on a roadway 104 used by a vehicle 105 or that is on a route calculated by the autonomous vehicle controller 160. The information about traffic conditions can include an average velocity of vehicles 105 on a roadway 104. In one embodiment, the autonomous vehicle controller 160 can generate a routing instruction that adjusts the speed, steering, or routing of the vehicle 105 based upon the information about traffic conditions identified in the state update 107. For example, the autonomous vehicle controller 160 can generate an updated route that yields a faster route to a destination based upon the traffic conditions as reflected in the state update 107.

Figure 3:
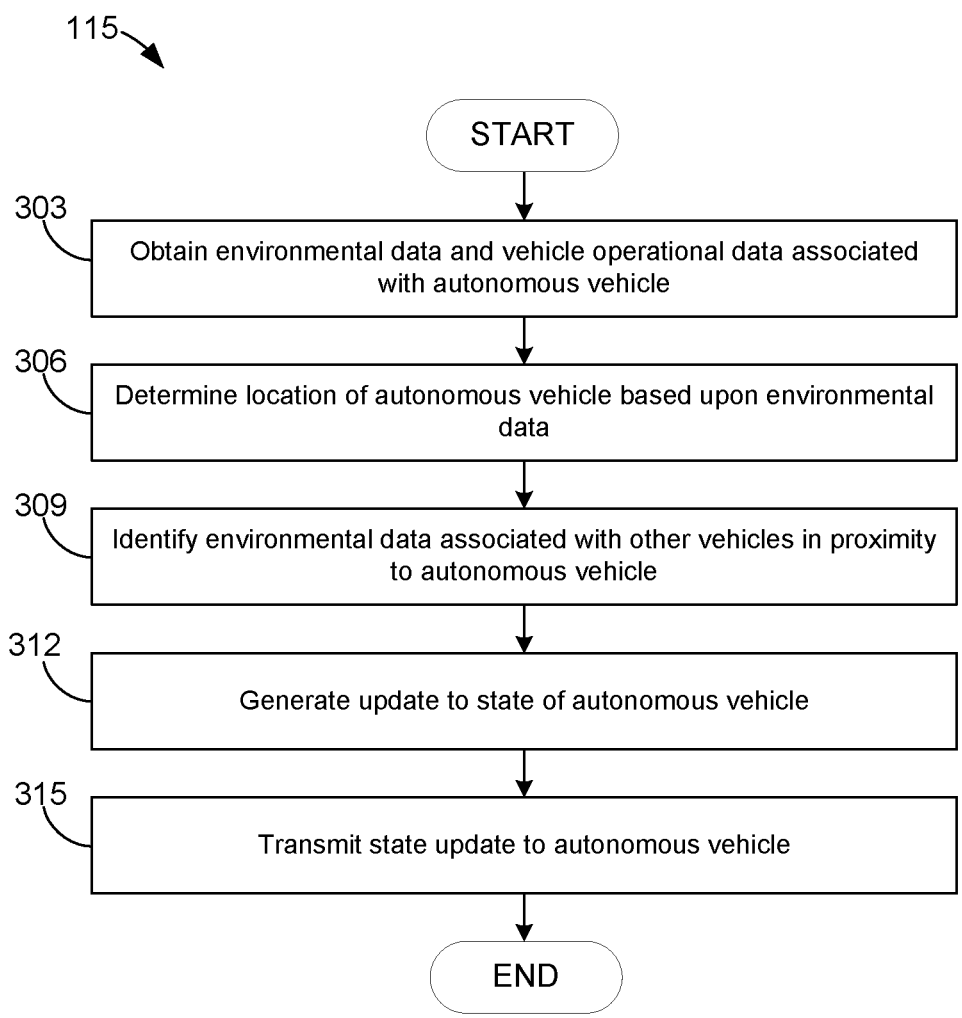
FIG. 3 is a flowchart illustrating one example of functionality implemented as portions of a roadway management system executed in the computing environment in the networked environment of FIGS. 1A-1B and 2 according to various embodiments of the present disclosure.

Referring next to FIG. 3, shown is a flowchart that provides one example of the operation of a portion of the roadway management system 115 according to various embodiments. It is understood that the flowchart of FIG. 3 provides merely an example of the many different types of functional arrangements that may be employed to implement the operation of the portion of the roadway management system 115 as described herein. As an alternative, the flowchart of FIG. 3 may be viewed as depicting an example of elements of a method implemented in the computing environment 103 according to one or more embodiments.

FIG. 3 provides an example of how the roadway management system 115 can generate a state update 107 that can be sent to vehicles 105 using a roadway 104. The state update 107 can include data from vehicles 105 that are in proximity to a particular vehicle 105 as well as from other data sources accessible to the roadway management system 115. First, at box 303, the roadway management system 115 can obtain environmental data 106 from a vehicle 105 using one or more roadways 104 managed by the roadway management system 115. The roadway management system 115 can also obtain vehicle operational data 159 from a vehicle 105 from which road hazards or other road conditions can be detected.

At box 306, the roadway management system 115 can extract a location from the environmental data 106 to determine a location of the vehicle 105 transmitting environmental data 106 to the roadway management system 115. As noted above, the information extracted from the environmental data 106 can be saved as vehicle status data 155 or vehicle environmental data 157 in the transportation network data store 112. Additionally, vehicle operational data 159 can also be stored in the transportation network data store 112 and associated with the vehicle. Next, at box 309, the roadway management system 115 can identify vehicle environmental data 157 associated with other vehicles that are in proximity to the vehicle 105.

At step 312, the roadway management system 115 can generate a state update 107 for the vehicle 105. The state update 107 can include the vehicle environmental data 157 as well as other roadway status data 130 for the roadway 104 on which the vehicle is traveling or other roadways 104 that are near the location of the vehicle 105 or that are on a route of the vehicle 105. Next, at step 315, the roadway management system 115 can transmit the state update 107 to the vehicle 105, which can update its vehicle state 187 using the state update 107 from the roadway management system 115. Thereafter, the process ends.

Figure 4:
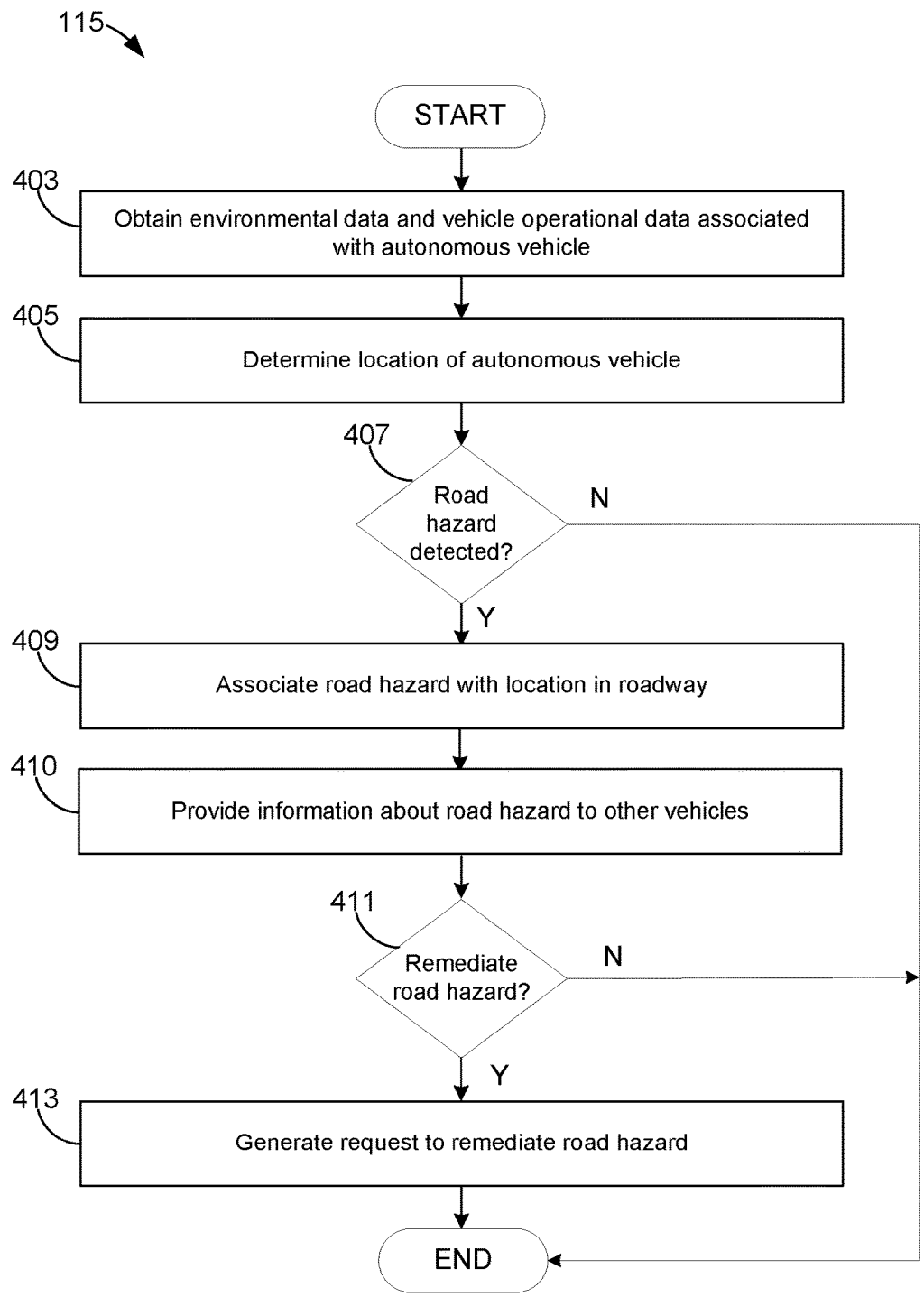
FIG. 4 is a flowchart illustrating one example of functionality implemented as portions of a roadway management system executed in the computing environment in the networked environment of FIGS. 1A-1B and 2 according to various embodiments of the present disclosure.

Referring next to FIG. 4, shown is a flowchart that provides another example of the operation of a portion of the roadway management system 115 according to various embodiments. FIG. 4 provides a non-limiting example of how the roadway management system 115 can remediate a road hazard that is detected by the roadway management system 115 in a portion or a particular location of a roadway 104 from an analysis of environmental data 106.

First, at box 403, the roadway management system 115 can obtain environmental data 106 from a vehicle 105 using one or more roadways 104 managed by the roadway management system 115. The roadway management system 115 can also obtain vehicle operational data 159 from a vehicle 105 from which road hazards or other road conditions can be detected. At box 405, the roadway management system 115 can extract a location from the environmental data 106 to determine a location of the vehicle 105 transmitting environmental data 106 to the roadway management system 115. At box 407, the roadway management system 115 can determine from the environmental data 106 whether a possible road hazard exists at the location of the vehicle 105. As noted above, the roadway management system 115 can detect a road hazard from an analysis of data embedded within the environmental data 106. For example, the roadway management system 115 can analyze wheel spin, suspension travel, temperature data, and other information that is provided within the environmental data 106 and from data sources external to the vehicle 105 to determine whether a road hazard exists. As another example, the roadway management system 115 can determine that a collision has occurred at the location of the vehicle 105 if the environmental data 106 reflects a sudden deceleration.

In some examples, the roadway management system 115 can also employ various image recognition techniques upon imagery or video captured by cameras, either on a vehicle 105 or positioned on or near the roadway 104, to identify road hazards and/or identify other environmental conditions. For example, the roadway management system 115 can detect obstructions, potholes or other issues with the roadway 104 based upon an analysis of imagery or video from various cameras. As another example, the roadway management system 115 can identify the presence of other vehicles 105 on the roadway that may present a risk of an imminent collision based upon an analysis of imagery obtained from various cameras.

If a road hazard is detected at box 407, the process proceeds to box 409, where the roadway management system 115 can associate a road hazard with the location of the vehicle 105. If no road hazard is detected, the process proceeds to completion. At box 409, the roadway management system 115 can associate the road hazard with the roadway status data 130. Proceeding to box 410, the information about the road hazard can then be provided to other vehicles 105 as a part of state updates 107 so that the vehicles 105 can make routing and navigation decisions based upon information about the road hazard.

At box 411, the roadway management system 115 can determine whether it can or should initiate remediation of the road hazard. The roadway management system 115 can initiate remediation of a road hazard if configured to do so. Additionally, the roadway management system 115 can be configured to initiate remediation of certain types of road hazards but not other types of road hazards. If the roadway management system 115 is configured to remediate the road hazard that is detected at box 407, the process proceeds to box 413.

At box 413, the roadway management system 115 can generate a request to remediate the road hazard. In one example, the roadway management system 115 can direct another vehicle 105 that is equipped with capabilities to remediate the road hazard to the location of the vehicle 105. For example, if the roadway management system 115 detects a collision, the roadway management system 115 can dispatch emergency vehicles to the location of the vehicle 105. If the roadway management system 115 detects a possible icy patch on the roadway 104 based upon the environmental data 106, the roadway management system 115 can generate a request for salt trucks or salt dispensing vehicles to the location of the vehicle 105. Similarly, if the roadway management system 115 detects a pothole or other defect in the roadway based upon an analysis of wheel spin or suspension travel data, the roadway management system 115 can direct repair vehicles or other resources to remediate or investigate a possible road hazard. Thereafter, the process proceeds to completion.

Figure 5:
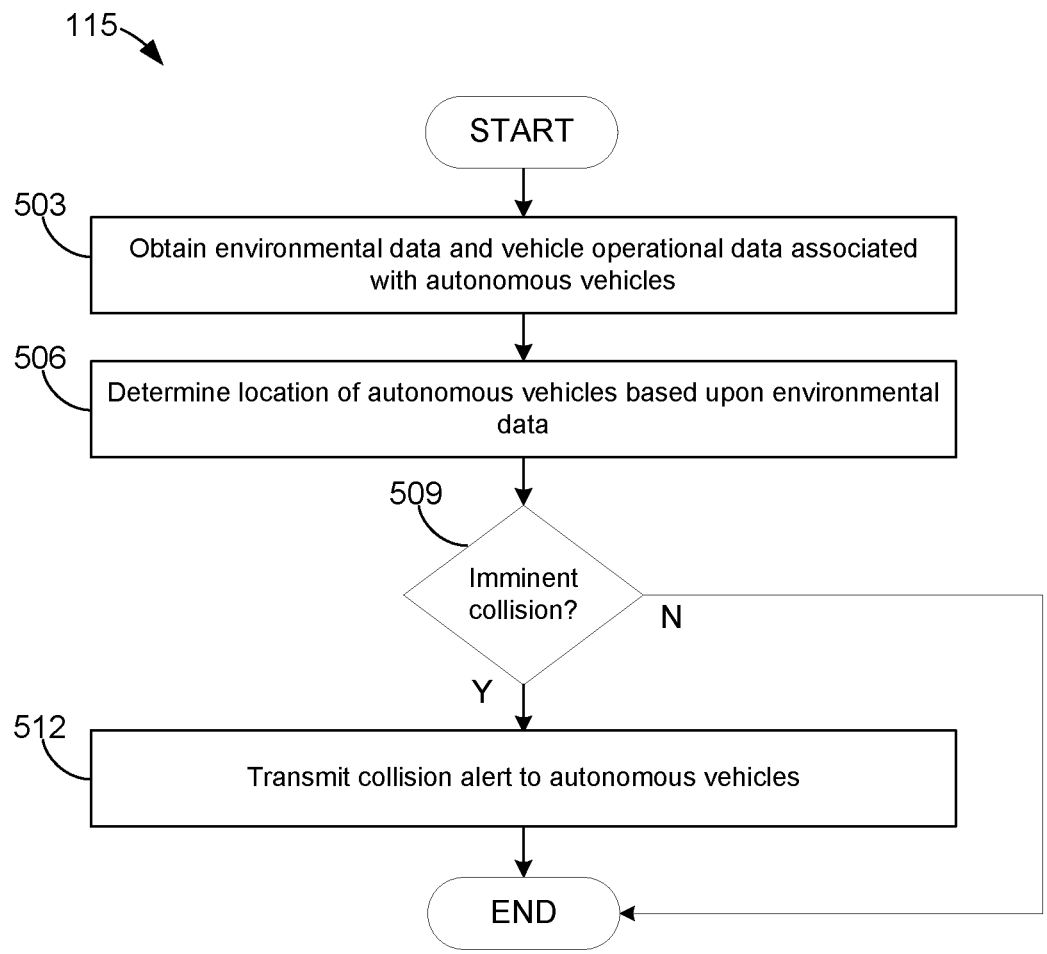
FIG. 5 is a flowchart illustrating one example of functionality implemented as portions of a roadway management system executed in the computing environment the networked environment of FIGS. 1A-1B and 2 according to various embodiments of the present disclosure.

Referring next to FIG. 5, shown is a flowchart that provides an example of the operation of the roadway management system 115 according to various embodiments. FIG. 5 illustrates an example of how the roadway management system 115 can generate collision alerts or warnings for vehicles 105 that may be at risk of an imminent collision with another vehicle 105.

First, at box 503, the roadway management system 115 can obtain environmental data 106 and/or vehicle operational data 159 from various vehicles 105 that are using one or more roadways 104 managed by the roadway management system 115. At box 506, the roadway management system 115 can extract a location from the data obtained from the vehicles 105 to determine their respective locations. At box 509, the roadway management system 115 can determine whether one or more of the vehicles 105 are at risk of an imminent collision with one another or an object in the roadway 104 based upon an analysis of the location, orientation, and/or velocity of the one or more vehicles 105.

In one embodiment, the roadway management system 115 can calculate a vector associated with the vehicle 105, where the vector embodies a speed and direction of the vehicle 105. Additionally, the vector can also include a temporal component and/or a location component, which indicate a location of the vehicle along with a timestamp. The vector can be calculated from an analysis of the environmental data 106 and/or vehicle operational data 159 over a brief period of time. The roadway management system 115 can also calculate a vector associated with other vehicles 105 that are located near the vehicle 105. If the vectors intersect such that an imminent collision can be detected, the roadway management system 115 can determine that a collision is imminent.

If an imminent collision is detected at box 509, the process proceeds to box 512, where the roadway management system 115 can transmit a collision alert to the vehicles 105 that are at risk of the imminent collision. Thereafter, the process proceeds to completion. Similarly, if no imminent collision is detected at box 509, the process proceeds to completion without generating a collision alert.

Figure 6:
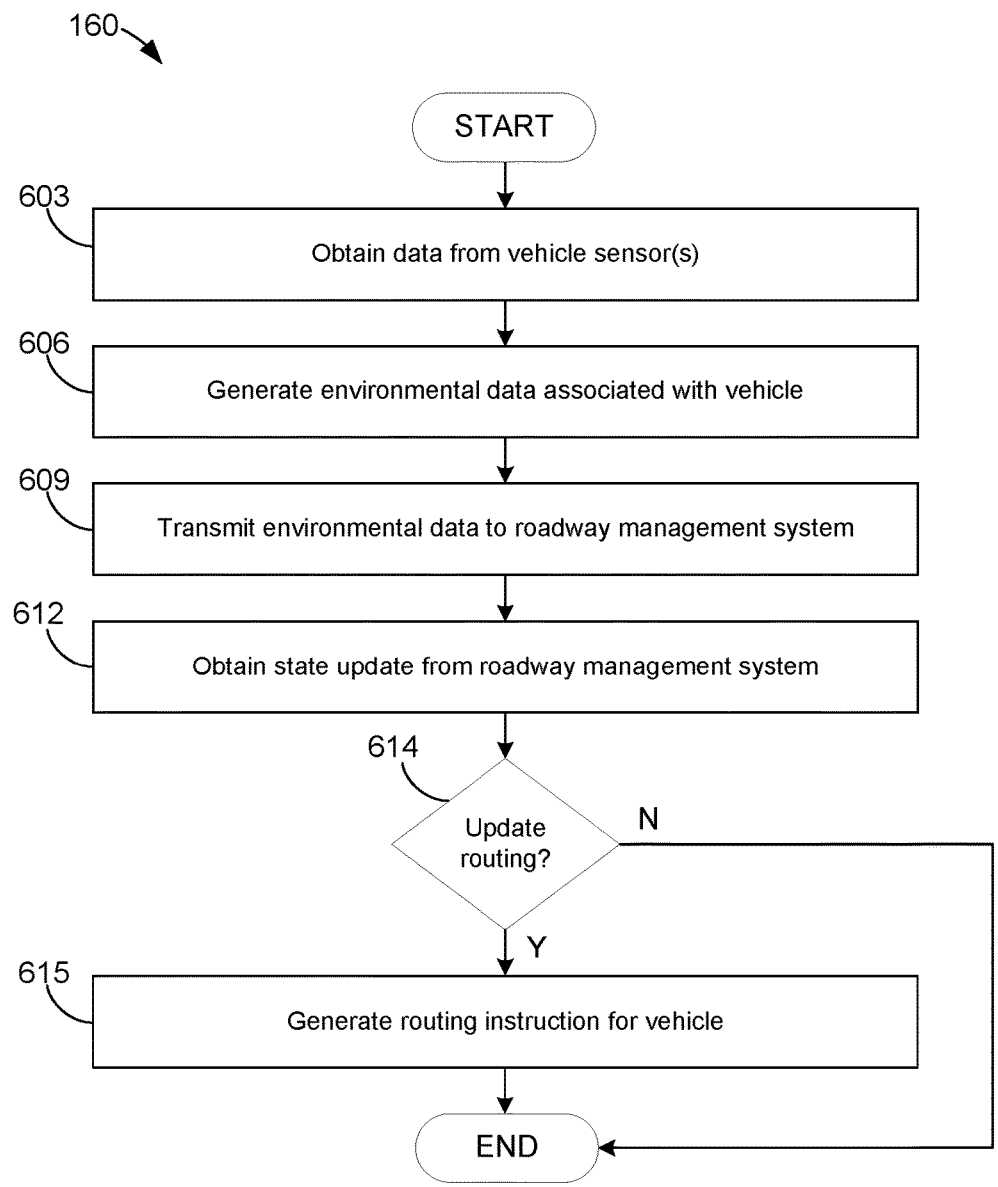
FIG. 6 is a flowchart illustrating one example of functionality implemented as portions of an autonomous vehicle controller executed in a vehicle in the networked environment of FIGS. 1A-1B and 2 according to various embodiments of the present disclosure.

Referring next to FIG. 6, shown is a flowchart that provides an example of the operation of the autonomous vehicle controller 160 according to various embodiments. FIG. 6 illustrates an example of how the autonomous vehicle controller 160 can obtain state updates 107 from the roadway management system 115 to update the vehicle state 187 stored in the vehicle 105.

First, at box 603, the autonomous vehicle controller 160 can obtain data from the various sensors of the vehicle 105. The sensors of the vehicle 105 can include the camera 175, drive system 163, location detection system 178, radar system 181 and any other data gathering components associated with the vehicle 105. At box 606, the autonomous vehicle controller 160 can generate environmental data 106 that incorporates the data from the various sensors of the vehicle 105.

At box 609, the autonomous vehicle controller 160 can transmit the environmental data 106 to the roadway management system 115. At box 612, the autonomous vehicle controller 160 can obtain a state update 107 from the roadway management system 115. The state update 107 can include information from nearby vehicles 105 and external data sources accessible to the roadway management system 115 with which the vehicle state 187 can be updated. At box 614, the autonomous vehicle controller 160 can determine whether a routing update that directs the vehicle 105 to changes in direction or velocity is required based upon the state update 107 and the change in the vehicle state 187. Such a change can be required if the autonomous vehicle controller 160 generates an updated route to a destination of the vehicle 105 based upon the location of other vehicles 105, road hazards, traffic conditions, weather data, or other information within the state update 107. If a change is required, then at box 615, the autonomous vehicle controller 160 generates routing instructions that instruct the drive system 163 to modify the direction or velocity of the vehicle 105. Next, the process can proceed to completion. If no change to the routing of the vehicle is required, the process can proceed to completion from box 614.

Figure 7:
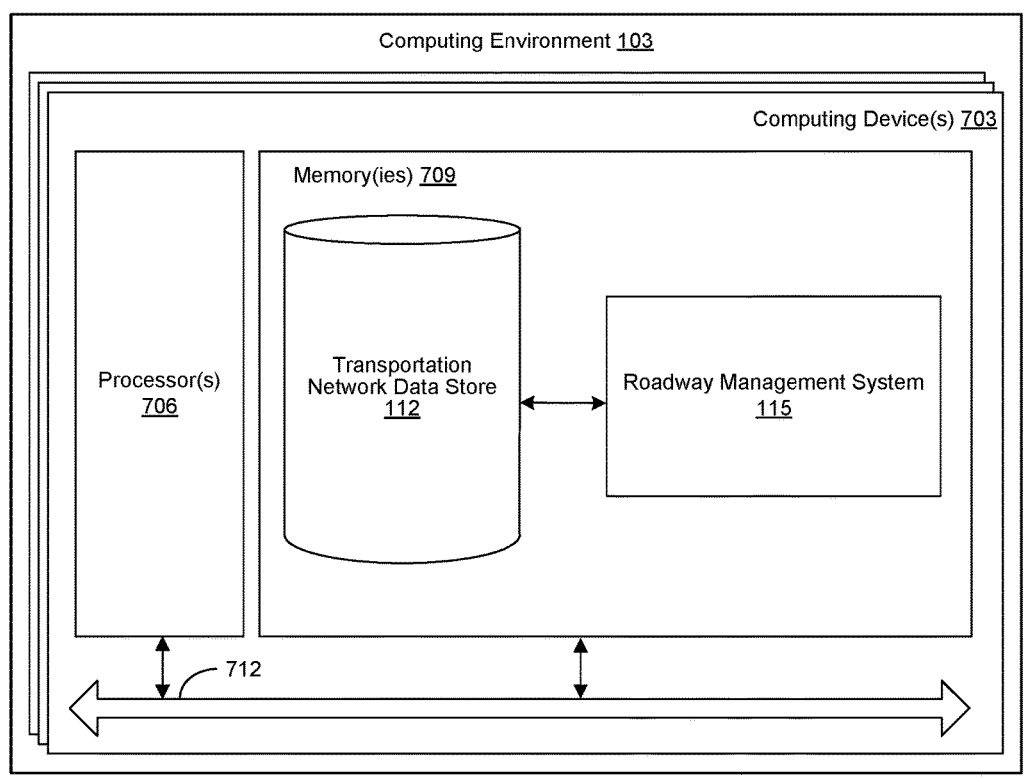
FIG. 7 is a schematic block diagram that provides one example illustration of a computing environment employed in the networked environment of FIGS. 1A-1B and 2 according to various embodiments of the present disclosure.

With reference to FIG. 7, shown is a schematic block diagram of the computing environment 103 according to an embodiment of the present disclosure. The computing environment 103 includes one or more computing devices 703. Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are the roadway management system 115 and potentially other applications. Also stored in the memory 709 may be a transportation network data store 112 and other data. In addition, an operating system may be stored in the memory 709 and executable by the processor 706.

It is understood that there may be other applications that are stored in the memory 709 and are executable by the processor 706 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 709 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706 may represent multiple processors 706 and/or multiple processor cores and the memory 709 may represent multiple memories 709 that operate in parallel processing circuits, respectively. In such a case, the local interface 712 may be an appropriate network that facilitates communication between any two of the multiple processors 706, between any processor 706 and any of the memories 709, or between any two of the memories 709, etc. The local interface 712 may comprise additional systems designed to coordinate this communication, including, for example, performing load balancing. The processor 706 may be of electrical or of some other available construction.

Although the roadway management system 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the roadway management system 115 and the autonomous vehicle controller 160. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the roadway management system 115 and autonomous vehicle controller 160, that comprises software or code can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the roadway management system 115 and the autonomous vehicle controller 160, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An autonomous vehicle, comprising:
a plurality of sensors configured to detect environmental data and operational data associated with the autonomous vehicle, the plurality of sensors comprising at least one camera and a location detection system, the environmental data associated with surroundings of the autonomous vehicle and the operational data being associated with an operational health of the autonomous vehicle;
a communications interface configured to facilitate communication with a roadway management system that is configured to receive data from a plurality of autonomous vehicles and a plurality of external data sources;
a controller configured to control operation of the autonomous vehicle, the controller being configured to cause the autonomous vehicle to at least:
  detect the environmental data and operational data associated with the autonomous vehicle based upon the plurality of sensors, the environmental data comprising a location of the autonomous vehicle, a velocity of the autonomous vehicle, and imagery from the at least one camera;
  generate a state of the autonomous vehicle based at least in part upon the environmental data and operational data;
  transmit the environmental data and operational data to the roadway management system via the communications interface;
  obtain an update to the state of the autonomous vehicle from the roadway management system, the update based at least in part upon environmental data and operational data obtained from at least a portion of the plurality of autonomous vehicles in communication with the roadway management system and at least one of the plurality of external data sources associated with a roadway on which the autonomous vehicle is located;
  identify a first vector associated with the autonomous vehicle from the environmental data;
  identify a second vector associated with another one of the plurality of autonomous vehicles from the environmental data;
  determine, based upon the first vector and the second vector, whether a collision between the autonomous vehicle and the other one of the plurality of autonomous vehicles is imminent;
  generate a collision alert in response to a determination of an imminent collision;
  generate a routing instruction for the autonomous vehicle to navigate on the roadway based at least in part upon the update to the state of the autonomous vehicle and the collision alert;

generate a request for assistance for the roadway management system based upon the environmental data and the operational data associated with the autonomous vehicle, the request comprising a type of assistance; and transmit the request for assistance to the roadway management system, wherein the roadway management system selects another of the plurality of autonomous vehicles to direct to a current location of the autonomous vehicle based upon the type of assistance.

2. The autonomous vehicle of claim 1, wherein the controller generates an alternate route associated with a destination based upon the environmental data and operational data obtained from the at least a portion of the plurality of autonomous vehicles.

3. The autonomous vehicle of claim 1, wherein the at least one of the plurality of external data sources comprises at least one roadway sensor in communication with the roadway management system.

4. The autonomous vehicle of claim 1, wherein the routing instruction is based upon at least one of a roadway condition indicated in the environmental data and the operational data obtained from the at least a portion of the plurality of autonomous vehicles or a proximity of one of the at least a portion of the plurality of autonomous vehicles to the autonomous vehicle.

5. A system, comprising:
at least one computing device;
a wireless communications interface facilitating communication with a plurality of autonomous vehicles;
a plurality of roadway sensors in communication with the at least one computing device;
at least one application executed in the at least one computing device, the at least one application being configured to cause the at least one computing device to perform a method comprising:
obtaining, via the plurality of roadway sensors, roadway status data associated with a portion of a roadway;
obtaining, via the wireless communications interface, environmental data and operational data from a plurality of autonomous vehicles using the portion of the roadway, the environmental data associated with respective surroundings of the plurality of autonomous vehicles and the operational data being associated with a respective operational health of the plurality of autonomous vehicles;
generating, based upon the roadway status data from at least a portion of the plurality of roadway sensors and the environmental data and operational data from at least a portion of the plurality of autonomous vehicles, an update to a state associated with an autonomous vehicle using the portion of the roadway;
transmitting, via the wireless communications interface, the update to the state to the autonomous vehicle;
identifying a first vector associated with a first one of the plurality of autonomous vehicles from the environmental data;
identifying a second vector associated with a second one of the plurality of autonomous vehicles from the environmental data;
determining, based upon the first vector and the second vector, whether a collision between the first one and the second one of the plurality of autonomous vehicles is imminent;
generating a collision alert in response to a determination of an imminent collision;
transmitting the collision alert to at least one of the first one or the second one of the plurality of autonomous vehicles;
identifying a road hazard based upon the environmental data and operational data, the road hazard detected by at least one of the plurality of autonomous vehicles, wherein identifying the road hazard comprises determining whether a degree of wheel spin detected by the at least one of the plurality of autonomous vehicles at a particular location in the portion of the roadway exceeds a threshold;
detecting a weather condition associated with the particular location in response to detection of at least one of a temperature condition or a precipitation condition associated with the degree of wheel spin; and
generating a request to remediate the road hazard in response to identifying the road hazard, wherein the request to remediate the road hazard comprises a request to direct another of the plurality of autonomous vehicles equipped to remediate the road hazard to the particular location.

6. The system of claim 5, wherein the at least one application is configured to cause the at least one computing device to perform the method further comprising transmitting the update to the state to the at least a portion of the plurality of autonomous vehicles.

7. The system of claim 5, wherein the plurality of roadway sensors comprise at least one of a camera configured to capture imagery of the portion of the roadway or an in-road sensor associated with the portion of the roadway.

8. The system of claim 5, wherein the update to the state associated with the autonomous vehicle comprises a location of at least a portion of the plurality of autonomous vehicles in the portion of the roadway.

9. An autonomous vehicle, comprising:
a plurality of sensors configured to detect environmental data and operational data associated with the autonomous vehicle;
a communications interface facilitating communication over a network;
a controller configured to control the autonomous vehicle, the controller further configured to perform a method comprising:
obtaining environmental data and operational data associated with the autonomous vehicle, the environmental data including a current location of the autonomous vehicle on a portion of a roadway and the operational data being associated with an operational health of the autonomous vehicle;
generating a state associated with the autonomous vehicle based upon the environmental data and operational data;
transmitting the environmental data and the operational data to a roadway management system associated with the portion of the roadway;
obtaining an update to the state associated with the autonomous vehicle from the roadway management system, the update based upon environmental data and operational data associated with a plurality of autonomous vehicles using the portion of the roadway;

updating the state associated with the autonomous vehicle based upon the update;

identifying a first vector associated with the autonomous vehicle from the environmental data;

identifying a second vector associated with another one of the plurality of autonomous vehicles from the environmental data;

determining, based upon the first vector and the second vector, whether a collision between the autonomous vehicle and the other one of the plurality of autonomous vehicles is imminent;

generating a collision alert in response to a determination of an imminent collision;

generating a request for assistance for the roadway management system based upon the environmental data and the operational data associated with the autonomous vehicle, the request comprising a type of assistance; and transmitting the request for assistance to the roadway management system, wherein the roadway management system selects another of the plurality of autonomous vehicles to direct to the current location of the autonomous vehicle based upon the type of assistance.

10. The autonomous vehicle of claim 9, wherein the controller is configured to perform the method further comprising:

generating a routing instruction for the autonomous vehicle based upon the collision alert.

11. The autonomous vehicle of claim 9, wherein the collision alert is based upon second environmental data and second operational data associated with a second autonomous vehicle of the plurality of autonomous vehicles, the second environmental data associated with surroundings of the second autonomous vehicle and the second operational data being associated with an operational health of the second autonomous vehicle.

12. The autonomous vehicle of claim 10, wherein the routing instruction generated based upon the collision alert overrides a previous routing instruction corresponding to the state associated with the autonomous vehicle.

13. The autonomous vehicle of claim 9, wherein the controller is configured to perform the method further comprising:

extracting data associated with a road hazard from the update obtained from the roadway management system, wherein the update is further based upon data received from a plurality of external sensors associated with the portion of the roadway; and generating a routing instruction for the autonomous vehicle based upon the data associated with the road hazard.

14. The autonomous vehicle of claim 13, wherein the data associated with the road hazard comprises at least one of an amount of wheel spin or an amount of suspension travel for at least one wheel of at least one of the plurality of autonomous vehicles over a specified period of time, or roadway condition data received from at least one of the plurality of external sensors associated with the portion of the roadway.

* * * * *